Oct. 1, 1940.  O. MADER  2,216,416
MEANS FOR BRAKING AIRCRAFT
Filed Nov. 6, 1936  3 Sheets-Sheet 1
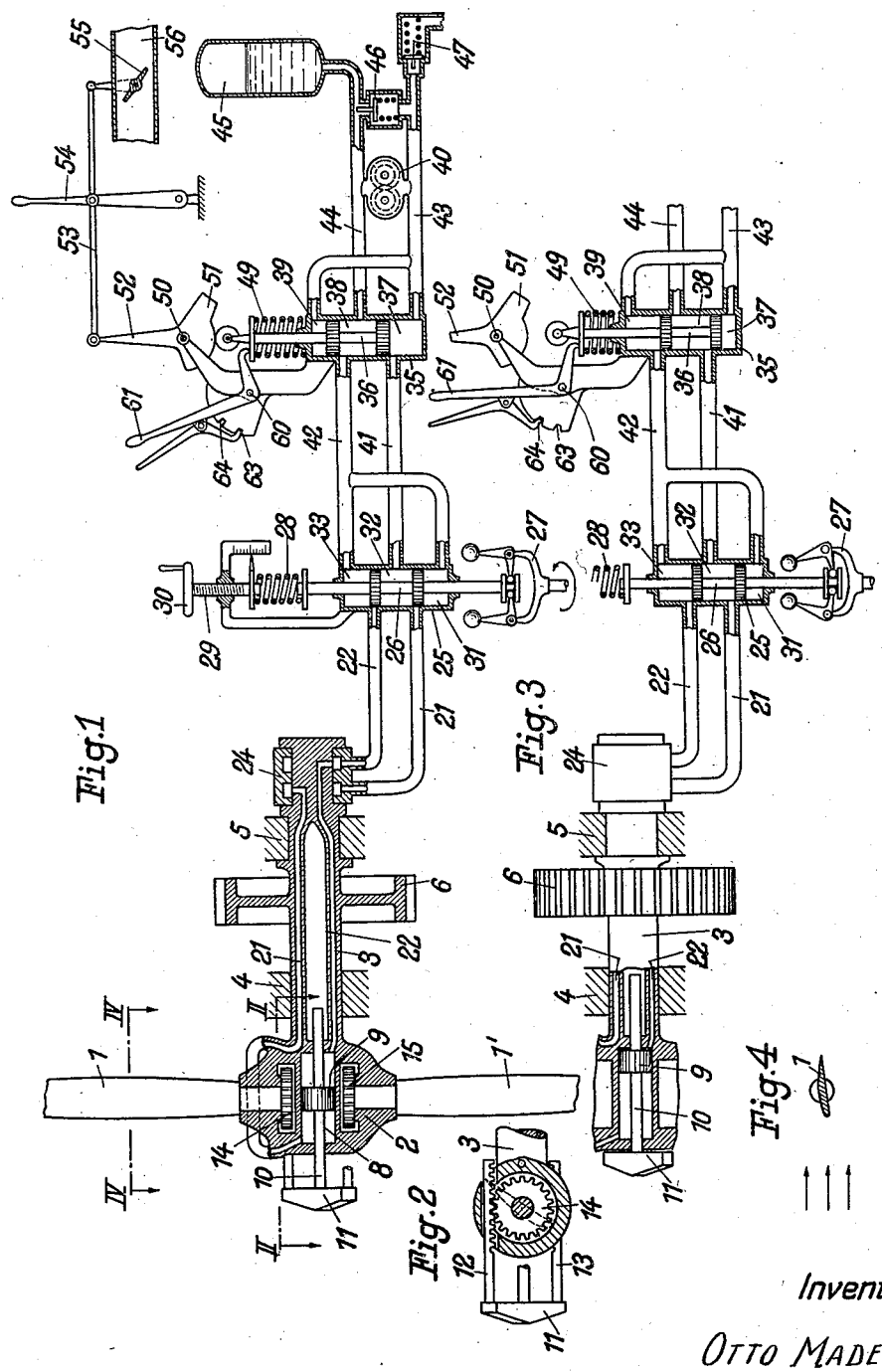
Inventor:
OTTO MADER

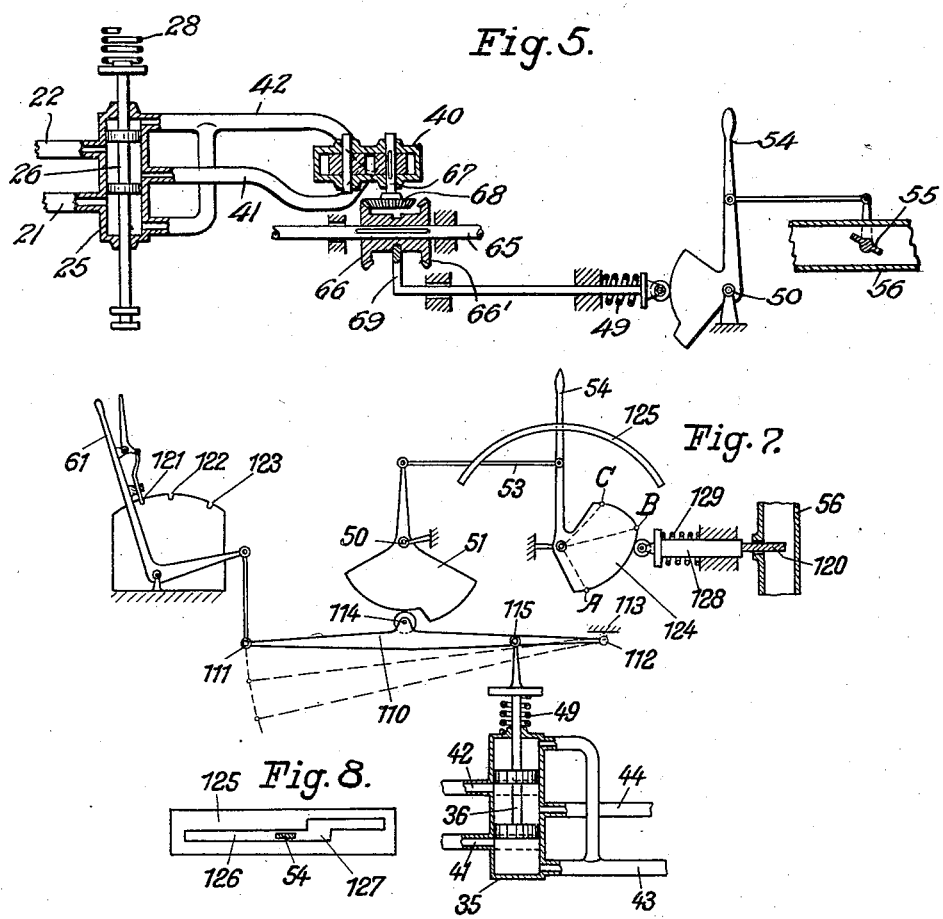

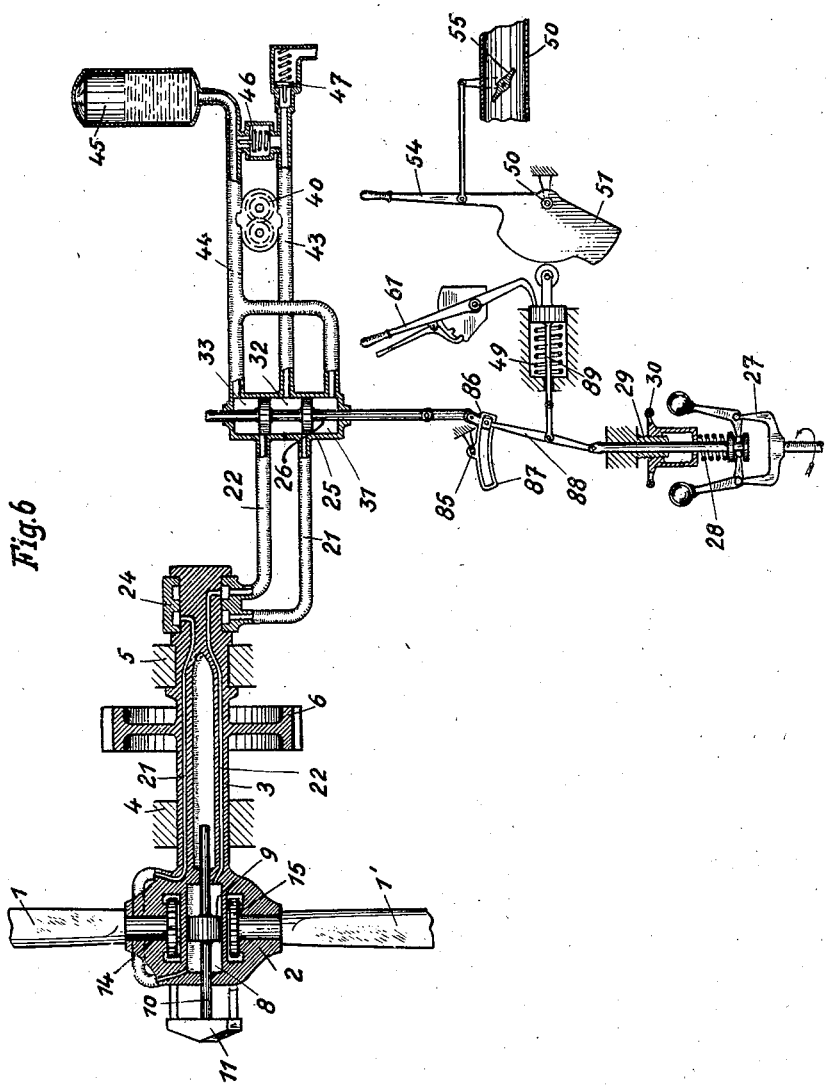

Patented Oct. 1, 1940

2,216,416

UNITED STATES PATENT OFFICE 2,216,416

MEANS FOR BRAKING AIRCRAFT

Otto Mader, Dessau-Ziebigk, Germany, assignor to Junkers Flugzeug-und-Motorenwerke Aktiengesellschaft, Dessau, Germany Application November 6, 1936, Serial No. 109,464
In Germany November 12, 1935

8 Claims. (Cl. 170—135.6)

This invention relates to means for braking aircraft and more especially airplanes during flight, for instance during a nose dive. The screw propellers have already been used for braking aircraft in that the blades are adjusted to a negative pitch so that on being rotated by the engine they create a negative thrust, i. e. a force which acts towards braking the propulsion of the craft. As a rule this adjustment of the blades in proportion to the actual condition of flight is effected manually, either directly or with the aid of an auxiliary force. In any case the pilot is required to operate the adjusting device, which, under the extraordinary conditions of a nose dive, is highly undesirable, apart from the danger that in the region of low pitch the engine may start racing. For all these reasons the use of ordinary variable pitch propellers in the braking of the craft during a nose dive is undesirable.

In braking aircraft by aerodynamic means according to this invention a screw propeller is used, the blades of which are arranged for automatic adjustment, during rotation, in dependency from the number of rotations by means of an hydraulic auxiliary motor. This hydraulic auxiliary motor is so designed that the direction of flow of the driving liquid in the motor also determines the direction of adjustment of the blades. This direction of flow is controlled by a valve inserted in the liquid conduits leading from the liquid reservoir to the auxiliary motor and back, and this valve is connected with a speed-responsive member, such as a centrifugal governor.

During normal flight this device acts as follows: On the normal number of rotations being overstepped, the speed-responsive member is deflected in one sense and adjusts the valve in such manner that the driving liquid passes through the hydraulic auxiliary motor in that direction which causes the (positive) pitch of the blades to rise. On the normal number of rotations being decreased, the speed-responsive member is deflected towards the other side and now adjusts the valve in the opposite sense so that the liquid driving agent now passes through the motor in the opposite direction, whereby the motor acts towards reducing the (positive) pitch of the blades. Thus the resisting turning moment of the propeller is constantly and automatically adapted to the available turning moment of the engine in such manner that the number of rotations of the screw propeller remains substantially constant.

According to this invention this blade adjusting device is combined with an additional device, whereby the direction, determined by the deflection of the speed-responsive member, in which the driving liquid passes through the hydraulic engine, and simultaneously also the direction of adjustment of the blades can be reversed. In other words, on this additional device being thrown in, a rise of speed does not bring about a rise, but a drop of the pitch of the propeller blades, and this even up to the negative pitch, at which the screw propeller exerts a negative thrust, i. e. a braking effect. In proportion to the adjustment of the blades for negative pitch the turning moment to be overcome by the propeller engine rises and the number of revolutions of the engine drops again. On the normal number of rotations being decreased, the speed-responsive member now acts towards adjusting the blades for increased pitch, i. e. the negative pitch is reduced again so that the resistance of the propeller drops and the number of rotations rises. Therefore even when the blade adjusting device is set for braking action, the number of rotations is regulated automatically so that racing of the engine is avoided. The means for changing the direction of flow of the driving liquid may be so connected with the member (throttle) controlling the fuel supply to the propeller engine that it can be brought into action only if the throttle is adjusted for low fuel supply, and that it becomes automatically inoperative and the blades are adjusted again in the normal manner, if the throttle is adjusted again for normal fuel supply. I may however also arrange the parts in such manner that after the blade adjusting device has been set for braking action, the fuel supply to the propeller engine may be increased again during the braking operation, whereby the braking effect can be increased further.

By means of the additional device for reversing the direction of flow of the driving liquid I am further enabled, in case that the propeller engine should come to a standstill, to set the propeller blades to "sailing" position, in which the screw propeller, being at rest, creates the least resistance.

In the drawings affixed to this specification and forming part thereof several embodiments of a device according to this invention are illustrated diagrammatically by way of example.

In the drawings

Fig. 1 shows a variable pitch screw propeller with blades adjusted by hydraulic means, Fig. 2 being a cross section of the screw propeller on the line II—II in Fig. 1.

Figs. 3 and 4 illustrate details of the device of Fig. 1 as adjusted in a special case, Fig. 4 being a cross section of a propeller blade on the line IV—IV in Fig. 1.

Fig. 5 is an elevation, partly in axial section, of a special embodiment of the device for reversing the direction of flow of the driving agent in the hydraulic auxiliary motor.

Fig. 6 is a similar view of another embodiment of such a device.

Fig. 7 illustrates other modifications of details of a device according to this invention.

Fig. 8 is a plan view and partly a cross section of a detail shown in Fig. 7.

In all figures similar parts are marked with similar reference numerals.

Referring to the drawings and first to Fig. 1, 1 and 1' are blades of a screw propeller which are mounted for rotation in the hub body 2 rigidly connected to the propeller shaft 3. This shaft is supported in bearings 4, 5 and is driven by way of a gear 6 from the engine (not shown). In the hub 2 is formed a cylindrical cavity 8, in which a piston 9 with piston rod 10 is arranged for axial displacement. On the projecting end of the piston rod 10 is mounted a cross beam 11, to which are fixed two racks 12, 13, meshing with gears 14, 15, mounted on the blades 1, 1', so that on the piston 9 being displaced, both blades are turned through equal angles. The piston 9 is displaced by hydraulic pressure. To this end the two ends of the cylindrical cavity 8 are connected to conduits 21 and 22, respectively, which lead through the shaft 3 and a sleeve 24 to a slide valve casing 25. The conduits 21, 22 are controlled in the casing 25 by a slide valve 26 acted upon by a centrifugal governor 27 driven by the engine or the propeller shaft. The centrifugal force of the governor masses is counteracted by the tension of a spring 28 in such manner, that at a predetermined number of revolutions of the governor an equilibrium prevails between the force of the spring and the centrifugal forces. In this position of equilibrium the conduits 21 and 22 are closed by the slide valve 26. The tension of the spring can be changed by means of a screw 29 governed by a wheel 30. If such change is effected, the position of equilibrium will be reached at a different number of revolutions of the governor and in this manner the number of revolutions, which the governor is intended to keep constant, can be varied. The cylinder 25 is subdivided by the valve 26 into three separate compartments 31, 32, 33. To the middle compartment 32 is connected a conduit 41, to the two outer compartments 31 and 33 a conduit 42. These conduits lead to the cylinder 35 of a slide valve 36 which also forms, in the cylinder 35, three separate compartments 37, 38, 39, the two outer ones (37, 39) being connected through pipe 43 with the suction side, the middle space 38 through pipe 44 with the pressure side of a pump 40 which may either be driven by the propeller engine or by a separate auxiliary motor. In the first case I prefer inserting in the pressure pipe a device such as a reservoir 45 enclosing air which, when the propeller engine and the pump 40 are at rest, continues supplying liquid under pressure for the blade adjustment, which can thus be effected also when the propeller engine is stopped. Between the pressure pipe 44 and suction pipe 43 is arranged a safety valve 46, which allows the liquid to pass over to the suction pipe as long as the slide valve 26 is in its middle position. In the suction pipe 43 is further provided a check valve 47 leading to the atmosphere, which opens when the pump 40 is at rest and the blades are adjusted by means of pressure fluid from the reservoir 45, since in that case the corresponding quantity of liquid must be displaced from the suction pipe. The slide valve 36 can be adjusted in one direction by a pressure spring 49 and in the opposite direction by a cam 51 rockable about a fixed point 50. To the cam 51 is connected a lever 52, which is connected by means of a rod 53 with the lever 54 serving to adjust the fuel supply to the engine. To the lever 54 may for instance be connected a throttle 55 provided in the conduit supplying mixture to the engine. The cam 51 is so shaped and connected to the lever 54, that during normal operation, with the throttle 55 in open position, the pressure pipe 44 of the pump is connected with the pipe 42, the suction pipe 43 with pipe 41, while, when changing over to idling, where the throttle 55 is nearly closed, the slide valve 36 is so adjusted, that now the pressure pipe 44 is connected with the pipe 41, the suction pipe 43 with pipe 42. A hand lever 61 rockable about a fixed pivot point 60 and fixed in its position by means of notches 63, 64, is designed to move the slide valve 36 into the last mentioned position and to lock it in this position also in the case when the lever 54 does not assume its idling position (as shown in Fig. 3). The valve 36 might as well be inserted in the conduits 21, 22, between the valve 26 and the adjusting device 8 and 9.

The operation of this device is as follows:

(a.) During normal flight:

The slide valve 36 is positioned as shown in Fig. 1, the compartments 31 and 33 of the cylinder 25 being connected with the pressure side, the compartment 32 with the suction side of pump 40, while the valve 26 may first be assumed to be located in its middle position. If the propeller tends to rotate faster than provided for, the governor 27 will intervene, compressing the spring 28 and adjusting the slide valve 26 from its middle position in such manner, that the pipe 21 is now connected with the pressure side, the pipe 22 with the suction pipe of pump 40. In consequence thereof piston 9 is shifted towards the right and the blades are adjusted to higher pitch. At the same time the resisting turning moment of the screw propeller rises and in consequence thereof the number of revolutions drops again as desired. The automatic regulation occurs in a corresponding manner if for some reason or other the number of revolutions should tend to drop; the blade is then adjusted to lower pitch and the circumferential force reduced thereby.

(b.) During a dive:

If the craft is intended to descend steeply, the pilot will first of all reduce the fuel supply by almost closing the throttle 55 by means of the lever 50. Since in spite of the reduced turning moment of the engine the governor tends to maintain the number of revolutions of the propeller, it will adjust the blades for a reduction of the pitch angle. Near the end of the throttling position of the fuel supply the slide valve 36 is displaced by the cam 51 in such manner that now the middle compartment 32 of the cylinder 25 is connected with the pressure side, the outer compartments 31, 33 with the suction side of the pump 40. During the steep descent, which now begins, the forward velocity is far greater than during normal flight and there thus results a negative pitch of the propeller blades. In consequence thereof there now also results a negative thrust $S'_1$ of the propeller which acts towards braking the craft.

If with a slight negative pitch the number of revolutions of the engine should still tend to increase, the governor will turn the propeller blades for increasing negative pitch. The engine, which is adjusted for running light and therefore develops only a small turning moment, is thus prevented from exceeding the predetermined number of revolutions. I thus obtain a construction in which the propeller generates a negative thrust which exerts a braking action on the propulsion of the craft, while at the same time the propeller automatically rotates at a predetermined number of revolutions, so that the engine is prevented from racing. This protective and braking action occurs automatically, without requiring any action by the pilot, whenever the craft starts on a dive and the fuel supply has been reduced to the usual minimum. If at the end of the dive the craft is righted again, the pilot will at once restore the full fuel supply and the switch device (valve 36) is then automatically returned to its normal position. Owing to the high turning moment of the engine, the propeller now tends to revolve at a higher speed and the governor consequently adjusts the blades again in the direction towards high pitch, until the equilibrium is restored between the resistance to revolution of the propeller and the turning moment of the engine. In order to prevent the number of revolutions of the engine running at full speed from rising excessively through the range of small pitch angles, although the adjusting devices may operate comparatively slowly, a separate safety governor, limiting the maximum number of revolutions, may, if desired, be provided on the engine.

The hand lever 61 renders it possible to adjust the propeller blades for the so-called sailing position, whenever, owing to a disturbance, the engine should come to a standstill. In this case the switching device (for instance the valve 36) is shifted by means of lever 61 into the position corresponding to braking, as shown in Fig. 3. The governor 27 is now at rest, developing no centrifugal forces, and the governor spring 28 therefore shifts the valve 26 into the position corresponding to a reduction of speed. Conduit 21 is now connected with the pressure pipe 44, conduit 22 with the suction pipe 43. The liquid under pressure therefore shifts the piston 9 altogether to the right until it contacts with the cylinder end wall. The propeller blades, which do not revolve, are thus turned into the position shown in Fig. 4, in which they offer the least resistance to the air flow. The valve 36 might also be replaced by a pump, the suction side of which can be exchanged for the pressure side, such as for instance a reversible gear pump. This is shown for instance in Fig. 5. On the driving shaft 65 permanently rotating in the same direction is mounted a body formed with two bevel gears 66 and 66', which rotates with the shaft and is axially displaceable by means of a rod 69, which is displaced in one direction by the spring 49, in the opposite direction by the cam 51 coupled with the gas lever 54. Between the gears 66 and 66' is inserted the bevel gear wheel 68 fixed on the pump shaft 67, so that according to the position of the bevel gears 66, 66' the pump revolves in one or the other sense. At each change of direction of rotation the suction and pressure sides of the pump are exchanged also. The pipes 41 and 42 leading to the cylinder 25 may therefore be connected directly to the pump 40.

Fig. 6 illustrates another means for reversing the flow of the driving liquid through the hydraulic auxiliary motor 8, 9 without requiring a separate slide valve (36 in Fig. 1). Here the valve rod 26 is connected with the governor 27 not directly, but by means of a double-armed lever with the stationary pivot of the part 85 and the lever arms 86, 87 forming a gate. One end of a bar 88 arranged for rocking motion is guided in this gate, the other end being pivoted to the spindle or the governor 27. To the bar 88 is further connected a link 89 which can be reciprocated, similarly as the valve 36 in Fig. 1, by a hand lever 61 or by a cam 51 adjustable by means of a lever 54. When adjusted for normal flight as shown in the drawing, the bar 88 transmits the governor motion to one arm 86 of the gate. In the braking position the link 89 is displaced by the cam 51 and the bar 88 is so adjusted as to transmit the governor motion to the other lever arm 87 of the gate. In this last-mentioned position there thus occurs with a certain alteration of the revolutions the adjustment of the propeller blades in the inverse direction as during normal flight.

In the modification illustrated in Fig. 7 a lever arm 110 is inserted between the valve 36 and the hand lever 61, one end 111 of this lever arm being connected to the lever 61, while the other end 112 is arranged for coaction with a stationary stop 113. Between the ends and at some distance from each other are arranged the point of action 114 of the cam 51 and the point of connection 115 of the valve 36. The lever 61 may be locked in three different positions by means of the notches 121, 122, 123. The first position (notch 121) is the normal position, in which the point 114 is held permanently applied against the cam 51 by the spring 49 of the slide valve 36, so that on the cam being rocked the valve is adjusted. In the second position (notch 122) the point 114 is lifted off the cam 51 and the end 112 of the lever now applies itself against the stop 113, the valve 36 being so adjusted as to just cover the conduits 41, 42 in the cylinder, 35, as shown in dash lines. In this arrangement of the parts the hydraulic adjusting device is brought to a standstill altogether, so that the propeller screw continues acting as a rigid propeller. The gas lever 54 can be adjusted freely throughout its entire range of adjustment. For instance if a disturbance should occur in the adjusting means, the flight might be continued, if desired, with strongly throttled engine. In the third position of the lever 61 (notch 123) the slide valve 36 has been shifted into its opposite end position, in which the connections are exchanged. Instead of the slide valve also another reversing device may be provided. This device thus enables the pilot to set the valve, independently from the position of the gas lever, into braking position and also to at any time and at any positions of the gas lever and blades, throw out the automatic adjusting mechanism altogether.

Fig. 7 further shows a special arrangement of the transmission of the throttle adjustment onto the means for varying the fuel supply to the propeller engine. The device for varying the fuel supply is for instance designed as a throttle 120 located in the intake pipe 56 of the engine. To the throttle lever 54 is connected a cam disk 124, into contact with which is permanently forced by a spring 129 a plunger 128 fixed to the slide 120. The radius of the circumferential curve of the cam steadily increases from A to B and decreases from B to C. If the plunger 128 is applied against point A of the cam, the fuel supply is adjusted for a maximum, in point B for a minimum and in point C for an intermediate figure. During normal operation the throttle lever 54 is adjusted only between the points A and B according as the engine shall be loaded. The additional portion B, C of the curve now renders it possible, after the changing over of the switch device on reaching the idling position B, to more powerfully drive the blades, arranged in braking position, by the engine and to thereby further increase the negative air force acting on the blade and thus also the braking action. The cam 51 adjusting the switch device must be so shaped that also within the additional range B, C of adjustment of the gas lever it will hold the switch device in the position required for braking.

In order to prevent the gas lever from being accidentally shifted by the pilot during normal flight beyond the idling position (which would be dangerous since then the engine would be operated with the increased fuel supply instead of running idle), an obstacle is preferably inserted in the path of the gas lever, which prevents it from moving beyond the idling position so that the pilot, in case he should desire to shift the gas lever beyond this position, is forced to first remove this obstacle. The gas lever may for instance be guided in a gate 125, the slot 126 of which may be formed, as shown in Fig. 8, with a step 127 corresponding to the position of the gas lever in point B, whereby the gas lever, in order to be shifted farther beyond the step must be moved sideways.

I wish it to be understood that I do not desire to be limited to the exact details of construction shown and described for obvious modifications will occur to a person skilled in the art.

I claim:

1. An engine throttle controlled system for reversing the pitch of a variable pitch propeller comprising hydraulic motor means for varying the pitch of the propeller blades, a hydraulic pump, lead and return conduits connecting said pump to said motor means, a valve interconnecting said conduits, governor means for actuating said valve to reverse the direction of fluid flow therein upon changes in propeller speed whereby said motor means varies the propeller pitch to maintain a substantially constant propeller speed, an engine throttle, and means operable by a predetermined movement of said throttle for further reversing the direction of flow of fluid from said pump through said valve whereby said propeller blades are changeable from a positive to a negative pitch.

2. A system as in claim 1 further comprising means controlled by said throttle to reverse said fluid flow from said pump to said valve as said throttle is moved through an engine idling position.

3. A system as in claim 1, said means operable by said throttle comprising a second valve interconnecting said conduits between said pump and said first named valve, a throttle lever, and cam means joining said lever to said second valve.

4. A control system for a hydraulic adjustable pitch propeller comprising a hydraulic mechanism responsive to the direction of flow of a fluid medium and geared to the blades of said propeller for varying the pitch thereof, a fluid pump, a pair of conduits extending between said mechanism and pump, a governor responsive to changes in propeller speed, a two headed piston valve interconnecting said conduits for effecting a reversal of fluid therein, means joining said governor to said valve for operating said valve to vary the pitch of the propeller blades for maintaining a substantially constant propeller speed, and a manually operated two headed piston valve further interconnecting said conduits for effecting a second reversal of fluid therein whereby said governor maintains a substantially constant propeller speed for a positive or negative pitched propeller.

5. A control system as in claim 4, said pump comprising a gear pump, and said means for further reversing the flow of liquid through said valve comprising reversible drive means for said pump, and cam means joining said throttle to said reversible drive means for varying the direction of drive of said pump in accordance with the throttle setting.

6. A control system for a hydraulic adjustable pitch propeller comprising a pump, hydraulic means responsive to fluid pressure from said pump for varying the pitch of the blades of said propeller, a reversing valve, a first pair of conduits extending between said pump and said valve, a second pair of conduits extending between said valve and said hydraulic means, a governor, a manual control, and means interlinking said valve to said governor and said control for operating said valve by said governor and for reversing by said control the normal direction of operation of said valve by said governor.

7. A control system as in claim 6, further including a fluid pressure tank connected to the pressure side of said pump for providing fluid pressure to said first and second pairs of conduits when said pump is inoperative.

8. An apparatus for reversing the pitch of a constant speed propeller comprising hydraulic means for varying the pitch of the propeller blades, a pump, lead and return lines joining said pump to said hydraulic means, fluid flow reversing means interconnecting said lines, a governor responsive to changes in engine speed, means joining said governor to said means for operating said means to reverse the flow of fluid in said lines so that said hydraulic mechanism is actuated to vary the blade pitch, an engine fuel supply line, a throttle for controlling the flow of fuel through said line, and means joining said throttle to said reversing means for interchanging the direction of control of said reversing means as said throttle moves through an engine idling position whereby the pitch of said blades is reversed and said governor functions for either a positive or negative pitch to maintain a substantially constant engine speed.

OTTO MADER.